United States Patent
Voigt et al.

(10) Patent No.: US 10,235,597 B2
(45) Date of Patent: Mar. 19, 2019

(54) METHODS AND A COMPUTING DEVICE FOR DETERMINING WHETHER A MARK IS GENUINE

(71) Applicant: SYS-TECH SOLUTIONS, INC., Princeton, NJ (US)

(72) Inventors: Matthias Voigt, Lawrenceville, NJ (US); Michael L. Soborski, Allentown, NJ (US); Rafik Ayoub, Princeton Junction, NJ (US)

(73) Assignee: Sys-Tech Solutions, Inc., Princeton, NJ (US)

( * ) Notice: Subject to any disclaimer, the term of this patent is extended or adjusted under 35 U.S.C. 154(b) by 202 days.

(21) Appl. No.: 15/180,252

(22) Filed: Jun. 13, 2016

(65) Prior Publication Data

US 2016/0371303 A1 Dec. 22, 2016

Related U.S. Application Data

(60) Provisional application No. 62/180,477, filed on Jun. 16, 2015.

(51) Int. Cl.
*G06F 17/30* (2006.01)
*G06K 9/62* (2006.01)
(Continued)

(52) U.S. Cl.
CPC ..... *G06K 9/6215* (2013.01); *G06F 17/30256* (2013.01); *G06F 17/30277* (2013.01);
(Continued)

(58) Field of Classification Search
CPC ...................................................... G06F 17/30
(Continued)

(56) References Cited

U.S. PATENT DOCUMENTS

| 5,153,418 A | 10/1992 | Batterman et al. |
| 5,325,167 A | 6/1994 | Melen |

(Continued)

FOREIGN PATENT DOCUMENTS

| CN | 103279731 A | 9/2013 |
| GB | 2221870 A | 2/1990 |

(Continued)

OTHER PUBLICATIONS

Ahmed et al., "The structural microscopically analysis for the full color printers & copiers utilized in valuable secured prints counterfeiting crimes," WAN-IFRA, Mar. 3, 2011, 13 pages.

(Continued)

*Primary Examiner* — Kim T Nguyen
(74) *Attorney, Agent, or Firm* — Drinker Biddle & Reath LLP

(57) ABSTRACT

According to various implementations, a computing device receives an image of a candidate mark and uses the image to create a profile of a feature of the mark. The computing device filters out, from the profile, all spatial frequency components except for a first band of spatial frequency components, resulting in a first filtered profile for the feature. The computing device repeats this filtering process for a second band of spatial frequency components, resulting in a second filtered profile for the feature, and may repeat this filtering process for further spatial frequency bands. The computing device compares the first filtered profile of the candidate mark with an equivalent first filtered profile of a genuine mark, and may repeat this process for further filtered profiles.

20 Claims, 13 Drawing Sheets

(51) Int. Cl.
  *G06K 7/10* (2006.01)
  *G06K 19/06* (2006.01)
  *G06K 7/14* (2006.01)
  *G06K 9/46* (2006.01)
  *G06K 9/18* (2006.01)

(52) U.S. Cl.
  CPC ....... *G06K 7/10861* (2013.01); *G06K 7/1413* (2013.01); *G06K 7/1447* (2013.01); *G06K 7/1452* (2013.01); *G06K 9/18* (2013.01); *G06K 9/4604* (2013.01); *G06K 19/06028* (2013.01); *G06K 19/06037* (2013.01)

(58) Field of Classification Search
  USPC ....................................................... 707/728
  See application file for complete search history.

(56) References Cited

U.S. PATENT DOCUMENTS

| | | | |
|---|---|---|---|
| 5,351,834 A | 10/1994 | Duss | |
| 5,465,303 A | 11/1995 | Levison et al. | |
| 5,521,984 A | 5/1996 | Denenberg et al. | |
| 5,563,401 A | 10/1996 | Lemelson | |
| 5,583,950 A | 12/1996 | Prokoski | |
| 5,673,338 A | 9/1997 | Denenberg et al. | |
| 5,706,091 A * | 1/1998 | Shiraishi | G03F 7/701 355/53 |
| 5,883,971 A | 3/1999 | Bolle et al. | |
| 5,903,356 A * | 5/1999 | Shiraishi | G03F 7/701 250/548 |
| 5,946,103 A | 8/1999 | Curry | |
| 5,978,495 A | 11/1999 | Thomopoulos et al. | |
| 6,032,861 A | 3/2000 | Lemelson et al. | |
| 6,185,318 B1 | 2/2001 | Jain et al. | |
| 6,398,117 B1 | 6/2002 | Oakeson et al. | |
| 6,421,123 B1 * | 7/2002 | Shiraishi | G03F 7/701 356/399 |
| 6,460,766 B1 | 10/2002 | Olschafskie et al. | |
| 6,470,093 B2 | 10/2002 | Liang | |
| 6,543,691 B1 | 4/2003 | Lemelson et al. | |
| 6,612,494 B1 | 9/2003 | Outwater | |
| 6,760,472 B1 | 7/2004 | Takeda et al. | |
| 6,922,480 B2 | 7/2005 | Rhoads | |
| 6,970,236 B1 | 11/2005 | Markantes et al. | |
| 7,013,024 B2 | 3/2006 | Cordery et al. | |
| 7,025,269 B2 | 4/2006 | Marshall | |
| 7,044,376 B2 | 5/2006 | Nelson et al. | |
| 7,080,041 B2 | 7/2006 | Nagel | |
| 7,107,453 B2 | 9/2006 | Yen et al. | |
| 7,162,035 B1 | 1/2007 | Durst et al. | |
| 7,229,025 B2 | 6/2007 | Sussmeier et al. | |
| 7,264,174 B2 | 9/2007 | Chang et al. | |
| 7,277,891 B2 | 10/2007 | Howard et al. | |
| 7,474,773 B2 | 1/2009 | Chau | |
| 7,526,110 B2 | 4/2009 | Niinuma et al. | |
| 7,533,062 B2 | 5/2009 | Sanchez et al. | |
| 7,576,842 B2 | 8/2009 | Park | |
| 7,577,844 B2 | 8/2009 | Kirovski | |
| 7,616,797 B2 | 11/2009 | Bailey et al. | |
| 7,673,807 B2 | 3/2010 | Simske et al. | |
| 7,697,729 B2 | 4/2010 | Howell et al. | |
| 7,752,077 B2 | 7/2010 | Holden et al. | |
| 7,773,812 B2 | 8/2010 | Hanus et al. | |
| 7,878,398 B2 | 2/2011 | Chen et al. | |
| 8,027,468 B2 | 9/2011 | McCloskey | |
| 8,061,611 B2 | 11/2011 | Cheung et al. | |
| 8,194,919 B2 | 6/2012 | Rodriguez et al. | |
| 8,267,321 B2 | 9/2012 | Kuyper-Hammond et al. | |
| 8,408,470 B2 | 4/2013 | Komatsu et al. | |
| 8,488,834 B2 | 7/2013 | Honsinger et al. | |
| 8,542,930 B1 | 9/2013 | Negro et al. | |
| 8,950,662 B2 | 2/2015 | Soborski | |
| 2002/0041712 A1 | 4/2002 | Roustaei et al. | |
| 2002/0087869 A1 | 7/2002 | Kim | |
| 2002/0113127 A1 | 8/2002 | Takeuchi et al. | |
| 2002/0122878 A1 | 9/2002 | Kerns et al. | |
| 2002/0171862 A1 | 11/2002 | Nagashige | |
| 2003/0021452 A1 | 1/2003 | Hamid | |
| 2003/0169456 A1 | 9/2003 | Suzaki | |
| 2004/0052400 A1 | 3/2004 | Inomata et al. | |
| 2004/0161153 A1 | 8/2004 | Lindenbaum | |
| 2004/0263911 A1 | 12/2004 | Rodriguez et al. | |
| 2005/0053236 A1 | 3/2005 | Samii et al. | |
| 2005/0161515 A1 | 7/2005 | Lubow | |
| 2005/0234857 A1 | 10/2005 | Plutchak et al. | |
| 2005/0257064 A1 | 11/2005 | Boutant et al. | |
| 2007/0041622 A1 | 2/2007 | Salva Calcagno | |
| 2007/0170257 A1 | 7/2007 | Haraszti | |
| 2007/0199991 A1 | 8/2007 | Haraszti et al. | |
| 2008/0025555 A1 | 1/2008 | Visan et al. | |
| 2008/0149725 A1 | 6/2008 | Rosenbaum | |
| 2008/0181447 A1 | 7/2008 | Adams et al. | |
| 2008/0226297 A1 | 9/2008 | Sinclair et al. | |
| 2009/0001164 A1 | 1/2009 | Brock et al. | |
| 2009/0169019 A1 | 7/2009 | Bauchot et al. | |
| 2009/0232368 A1 | 9/2009 | Niinuma et al. | |
| 2010/0027851 A1 | 2/2010 | Walther et al. | |
| 2010/0037059 A1 * | 2/2010 | Sun | G06T 1/005 713/176 |
| 2011/0121066 A1 | 5/2011 | Tian et al. | |
| 2011/0145889 A1 | 6/2011 | Tomkow | |
| 2012/0145779 A1 | 6/2012 | Bietenbeck et al. | |
| 2012/0242452 A1 | 9/2012 | Bauchot et al. | |
| 2012/0325902 A1 | 12/2012 | Goyal et al. | |
| 2013/0034290 A1 | 2/2013 | Lee et al. | |
| 2013/0228619 A1 | 9/2013 | Soborski | |
| 2013/0240628 A1 | 9/2013 | van der Merwe et al. | |
| 2013/0296039 A1 * | 11/2013 | Engineer | A63F 13/12 463/29 |
| 2014/0061316 A1 | 3/2014 | Narayanaswami et al. | |
| 2014/0078556 A1 * | 3/2014 | Anderson, III | B41F 33/0081 358/3.28 |
| 2014/0233828 A1 | 8/2014 | Lee et al. | |
| 2015/0061279 A1 * | 3/2015 | Cruz | G06K 9/00046 283/67 |
| 2015/0069117 A1 | 3/2015 | Rapoport et al. | |
| 2015/0083801 A1 * | 3/2015 | Soborski | G06K 19/06056 235/375 |
| 2015/0098655 A1 | 4/2015 | Chang et al. | |
| 2015/0262347 A1 | 9/2015 | Duerksen et al. | |
| 2015/0379321 A1 | 12/2015 | Soborski | |
| 2016/0371303 A1 * | 12/2016 | Voigt | G06F 17/30277 |
| 2017/0091611 A1 | 3/2017 | Soborski | |

FOREIGN PATENT DOCUMENTS

| | | |
|---|---|---|
| JP | 2004-109172 A | 4/2004 |
| JP | 2005-267598 A | 9/2005 |
| JP | 2009-109419 A | 5/2009 |
| JP | 2009-124599 A | 6/2009 |
| JP | 2012-039494 A | 2/2012 |
| JP | 2012-141729 A | 7/2012 |
| JP | 2014-203289 A | 10/2014 |
| JP | 2017-516214 A | 6/2017 |
| JP | 2017-532670 A | 11/2017 |
| KR | 10-2003-0051712 A | 6/2003 |
| KR | 10-2005-0093715 A | 9/2005 |
| RU | 2 208 248 C2 | 7/2003 |
| RU | 2370377 C2 | 10/2009 |
| RU | 2 451 340 C2 | 5/2012 |
| RU | 2458395 C2 | 8/2012 |
| RU | 2461883 C2 | 9/2012 |
| RU | 2 476 936 C2 | 2/2013 |
| RU | 2507076 C2 | 2/2014 |
| WO | 9603714 A1 | 2/1996 |
| WO | 9724699 A1 | 7/1997 |
| WO | 02/31752 A1 | 4/2002 |
| WO | 02/065782 A1 | 8/2002 |
| WO | 2008078009 A1 | 7/2008 |
| WO | 2009/044352 A1 | 4/2009 |
| WO | 2009/115611 A2 | 9/2009 |
| WO | 2010/021965 A1 | 2/2010 |

(56) References Cited

FOREIGN PATENT DOCUMENTS

| WO | 2011/076406 A1 | 6/2011 |
|---|---|---|
| WO | 2011077459 A2 | 6/2011 |
| WO | 2013/130946 A1 | 9/2013 |
| WO | 2015/130697 A1 | 9/2015 |

OTHER PUBLICATIONS

Office Action issued in related application KR 10-2015-7020798, dated Jul. 11, 2016, with English language translation, 14 pages.
PCT Search Report and Written Opinion issued in related application PCT/US2016/037149, dated Sep. 21, 2016, 10 pages.
Office Action issued in related application CA 2,960,716, dated Dec. 27, 2017, 5 pages.
Decision to Grant issued in related application RU 2017132260, dated Jan. 10, 2018, with English language translation, 27 pages.
Office Action issued in related application CN 201580062910.5, dated Jan. 30, 2018, with English language translation, 9 pages.
Examination Report issued in related application AU 2016278954, dated Jan. 31, 2018, 6 pages.
Office Action issued in related application KR 10-2017-7026160, dated Feb. 22, 2018, with English language translation, 19 pages.
Office Action issued in related application KR 10-2018-7001086, dated Feb. 22, 2018, with English language translation, 15 pages.
Office Action issued in related application JP 2017-541598, dated Mar. 7, 2018, with English language translation, 4 pages.
PCT Search Report and Written Opinion issued in related application PCT/US2017/022097, dated May 24, 2017, 17 pages.
Office Action issued in related application CA 2,960,716, dated Apr. 13, 2017, 4 pages.
Extended European Search Report issued in related application EP 15755854.5, dated Feb. 27, 2017, 11 pages.
Search Report issued in related application RU 2016138293/08, dated Feb. 7, 2017, with English language translation, 4 pages.
"Rank, v.3", Def. 3a, OED Online, Oxford English Dictionary, 2nd Ed., 1989, Oxford University Press, <http://www.oed.com/oed2/00197225>: 5 pages.
Office Action issued in related application JP 2016-565026, dated Feb. 3, 2017, with English language translation, 12 pages.
Seo et al., "A robust image fingreprinting system using the Radon transform," Signal Processing: Image Communication, Elsevier Science Publishers, Amsterdam, NL, Apr. 1, 2004, vol. 19 (4), pp. 325-339.
Examination Report issued in related application MY PI2014002470, dated Nov. 15, 2017, 3 pages.

Office Action issued in related application KR 10-2017-7026160, dated Nov. 21, 2017, with English language translation, 11 pages.
Notice of Acceptance issued in related application AU 2015383137, dated Nov. 24, 2017, 3 pages.
Third Party Observation filed in related application EP 13754659.4, dated Nov. 3, 2017, 3 pages.
Office Action issued in related application IL 253685, dated Jan. 6, 2018, with English language translation, 6 pages.
Decision to Grant Patent issued in related application JP 2017-515692, dated Jan. 10, 2018, with English language translation, 6 pages.
Supplementary European Search Report issued in related application EP 15882884.8, dated Dec. 14, 2017, 4 pages.
Examination Report issued in related application EP 15882884.8, dated Jan. 23, 2018, 7 pages.
PCT Search Report and Written Opinion issued in related application PCT/US2017/064900, dated Jan. 12, 2018, 8 pages.
Office Action issued in related application JP 2017-515692, dated Aug. 2, 2017, with English language translation, 5 pages.
Examination Report issued in related application AU 2015383137, dated Aug. 18, 2017, 3 pages.
Notice of Acceptance issued in related application AU 2015223174, dated Aug. 18, 2017, 3 pages.
Supplementary European Search Report issued in related application EP 15844793.8, dated Sep. 13, 2017, 4 pages.
Examination Report issued in related application EP 15844793.8, dated Oct. 6, 2017, 8 pages.
Office Action issued in related application CN 201580076348.1, dated Mar. 15, 2018, with English language translation, 16 pages.
Decision to Grant issued in related application RU 2018101250, dated Apr. 19, 2018, with English language translation, 22 pages.
Extended European Search Report issued in related application EP 16812194.5, dated May 11, 2018, 7 pages.
Notice of Acceptance issued in related application AU 2016278954, dated May 9, 2018, 3 pages.
Office Action issued in related application JP 2017-564394, dated May 14, 2018, with English language translation, 4 pages.
Office Action issued in related application IL 256161, dated May 31, 2018, with partial English language translation, 3 pages.
Examination Report issued in related application AU 2017234124, dated Sep. 25, 2018, 2 pages.
Notice of Acceptance issued in related application AU 2017234124, dated Nov. 13, 2018, 3 pages.
Office Action issued in related application CN 201580022895.1, dated Sep. 21, 2018, with English language translation, 23 pages.
Notice of Allowance issued in related application JP 2017-564394, dated Oct. 31, 2018, with English language translation, 6 pages.

\* cited by examiner

METHODS AND A COMPUTING DEVICE FOR DETERMINING WHETHER A MARK IS GENUINE

CROSS-REFERENCE TO RELATED APPLICATIONS

The present application claims priority to U.S. Provisional Patent Application 62/180,477, filed Jun. 16, 2015, the contents of which are incorporated herein by reference.

TECHNICAL FIELD

The present disclosure is related generally to anti-counterfeiting technology and, more particularly, to methods and a computing device for determining whether a mark is genuine.

BACKGROUND

Counterfeit products are, unfortunately, widely available and often hard to spot. When counterfeiters produce fake goods, they typically copy the labeling and bar codes in addition to the actual products. At a superficial level, the labels and bar codes may appear genuine and even yield valid data when scanned (e.g., decode to the appropriate Universal Product Code). While there are many technologies currently available to counter such copying, most of these solutions involve the insertion of various types of codes, patterns, microfibers, microdots, and other indicia to help thwart counterfeiting. Such techniques require manufacturers to use additional equipment and material and add a layer of complexity to the production process.

DRAWINGS

While the appended claims set forth the features of the present techniques with particularity, these techniques, together with their objects and advantages, may be best understood from the following detailed description taken in conjunction with the accompanying drawings of which:

DESCRIPTION

Figure 1:
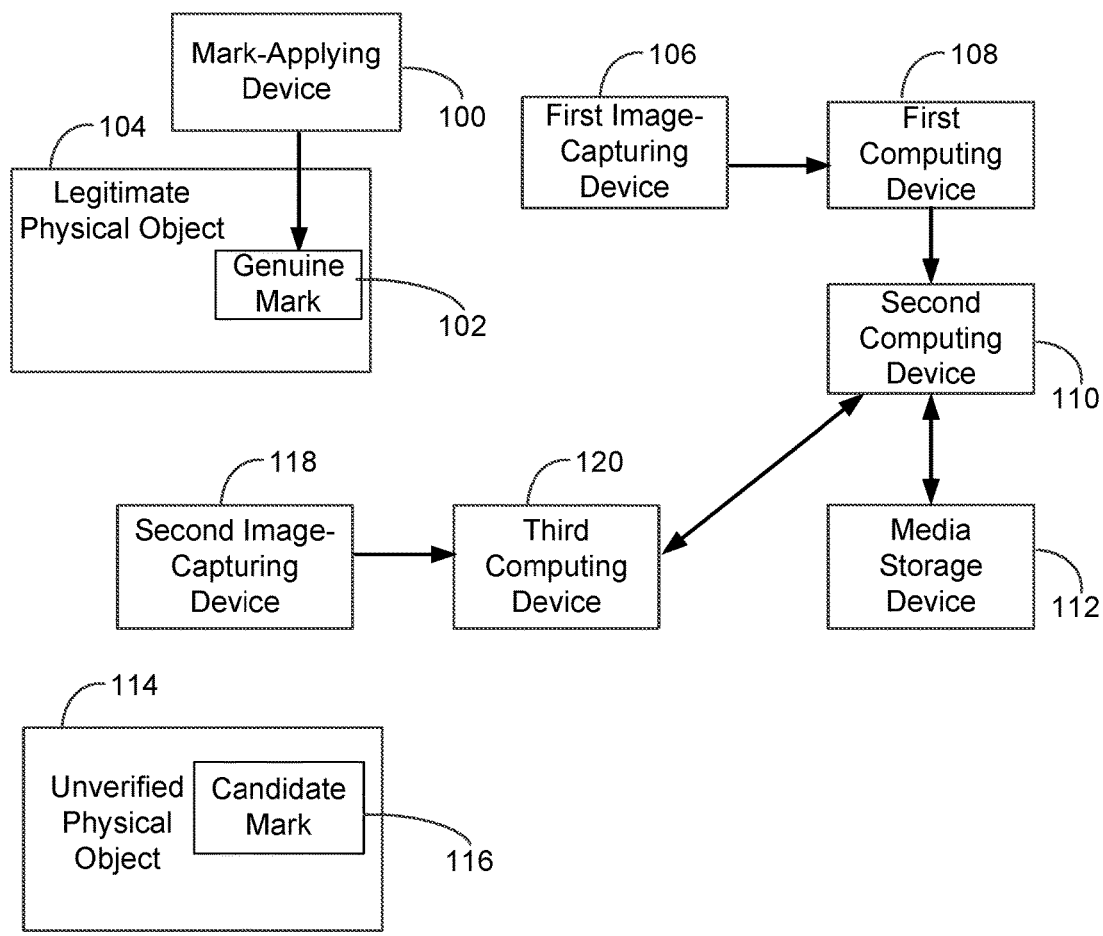
FIG. 1 is an example of a system in which various embodiments of the disclosure may be implemented.

The present disclosure is generally directed to methods and a computing device for determining whether a mark is genuine. According to various embodiments, a computing device (or logic circuitry thereof) receives (e.g., via a camera or via a communication network) an image of a candidate mark (e.g., a one-dimensional or two-dimensional barcode), uses the image to make measurements (e.g., linearity, color, or deviation from best-fit grid) of a characteristic of a feature (an edge, a cell, a bar, a subarea, a blank area, or an artifact) of the candidate mark, resulting in a profile for that feature. The computing device filters out, from the feature profile, all spatial frequency components except for a first band of spatial frequency components (e.g., by applying a band-pass filter), resulting in a first filtered profile for the feature. The computing device repeats this filtering process for a second band of spatial frequency components (e.g., by applying a second band-pass filter to the original feature profile), resulting in a second filtered profile for the feature. The computing device may repeat this filtering process for further spatial frequency bands. The computing device compares the first filtered profile of the candidate mark with an equivalent first filtered profile of a genuine mark (e.g., a filtered profile that the computing device obtained from an application of the same band-pass filter to measurements of the same characteristic of the same feature on the genuine mark). The computing device also compares the second filtered profile of the candidate mark with an equivalent second filtered profile of the genuine mark. The computing device determines whether the candidate mark is genuine (e.g., whether the candidate mark is, in fact, the genuine mark). The computing device may also use these comparisons to determine whether the candidate mark was printed from the same printing plate as the genuine mark (e.g., to identify a mark that was printed using a stolen printing plate).

In an embodiment, the feature that the computing device measures is an edge of the mark, and the characteristic of the edge that the computing device measures is its projected average pixel values. For example, the computing device may determine projected average pixel values in a portion of the candidate mark that includes the edge (e.g., along one or more edges of a barcode), resulting in a profile for the edge. The computing device filters out, from the edge profile, all spatial frequency components except for a first band of spatial frequency components (e.g., by applying a band-pass filter), resulting in a first filtered profile for the edge. The computing device repeats this filtering process for a second band of spatial frequency components (e.g., by applying a second band-pass filter to the original edge profile), resulting in a second filtered profile for the edge, and may repeat this filtering process for further spatial frequency bands. The computing device compares the first filtered profile of the candidate mark with an equivalent first filtered profile of a genuine mark (e.g., a filtered profile that the computing device obtained from an application of the same band-pass filter to a first profile of the same edge of the genuine mark). The computing device also compares the second filtered profile of the candidate mark with an equivalent second filtered profile of the genuine mark. The computing device determines whether the candidate mark is genuine based on these comparisons.

In an embodiment, for each comparison that the computing device makes with between a filtered profile of the candidate mark and a filtered profile of the genuine mark, the computing device assigns a correlation score. By mapping the band-pass filters applied to the feature profiles (of the candidate mark and the genuine mark) to the correlation scores (e.g., plotting each correlation score versus the band-pass filter that was applied to create the filtered profiles being compared), the computing device creates a spatial frequency spectrum correlation profile. The computing device determines whether the candidate mark is genuine based on its analysis of the spatial frequency spectrum correlation profile.

According to various embodiments, the computing device analyzes only a sub-portion of the spatial frequency spectrum correlation profile in order to identify the origin of the candidate mark. For example, the computing device may focus on the lowermost (e.g. lowest four) bands of the spatial frequency spectrum correlation profile in order to determine whether the candidate mark is a photocopy of the genuine mark.

This disclosure will often refer to a "mark." As used herein, a "mark" is a visible indicator that is intentionally put on a physical object. A mark may be something that identifies a brand (e.g., a logo), something that bears information, such as a barcode (e.g., a two-dimensional ("2D") barcode as specified in the International Organization for Standardization ("ISO") and the International Electrotechnical Commission ("IEC") standard ISO/IEC 16022), an expiration date, or tracking information such as a serial number), or a decoration. A mark is visible in some portion of the electromagnetic spectrum, though not necessarily with the naked eye. A "feature" of a mark is something on the mark that is visible (either to the aided or unaided eye). A "characteristic" of a feature is some measureable aspect of the feature, such as its linearity, color, or deviation from a best-fit grid.

A "profile" is a set of measurements of one or more characteristics of a feature. In various embodiments, one or more computing devices described herein may use one or more profiles in order to determine whether or not a mark is genuine. The following is a non-exhaustive list of types of profiles: an edge profile, a cell profile, a subarea profile, and an artifact profile.

The term "artifact" as used herein is a feature of a mark that was produced by the machine or process that created the mark, but not by design or intention (i.e., an irregularity). An artifact may have measurable characteristics. Examples of artifacts and their measurable characteristics include: (a) deviation in average color of a subarea (e.g., a cell of a 2D barcode) from an average derived from within the mark (which may be an average for neighboring cells of the same nominal color), (b) bias in the position of a subarea relative to a best-fit grid of neighboring subareas, (c) areas of a different one of at least two colors from a nominal color of the cells, (d) deviation from a nominal shape of a continuous edge within the mark, and (e) imperfections or other variations resulting from the mark being printed, such as extraneous marks or voids. In some embodiments, an artifact is not controllably reproducible.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a computing device carrying out an action, it is to be understood that this can also mean that logic circuitry integrated with the computing device is, in fact, carrying out the action.

The term "mobile communication device" as used herein is a communication device that is capable of sending and receiving information over a wireless network such as a cellular network or a WiFi network. Examples of mobile communication devices include cell phones (e.g., smartphones), tablet computers, and portable scanners having wireless communication functionality.

The term "spatial frequency" as used herein refers to the periodicity of the variation in pixel color (e.g., grayscale color) over a distance. The units of spatial frequency are pixels per unit of linear distance. For convenient reference, spatial frequency may also be expressed herein in terms of wavelength (e.g., the distance between adjacent peaks in pixel grayscale variation). For example, applying a band-pass filter to permit only components whose wavelengths are between 0.3 millimeters and 3 millimeters is equivalent to applying a band-pass filter to permit only components whose spatial frequencies are between 3.33 pixels per millimeter and 0.33 pixels per millimeter. Thus, when the term "spatial frequency band" is used herein, it may include a range of spatial wavelengths.

Turning to FIG. 1, a mark-applying device 100 applies a genuine mark 102 ("mark 102") to a legitimate physical object 104 ("object 104"). In some embodiments, the object 104 is an article of manufacture, such as a piece of clothing, handbag, or fashion accessory. In other embodiments, the object 104 is a label, such as a barcode label or packaging for some other physical object. The mark 102 may be something that identifies a brand (e.g., a logo), something that bears information (e.g., a barcode), or a decoration. Possible embodiments of the mark-applying device 100 include a printer (e.g., a laser or thermal printer), an etching device, an engraving device, a mold-applying device, a branding device, a stitching device, and a thermal-transfer device. The mark-applying device 100 applies the mark 102 by, for example, printing, etching, engraving, molding, branding, stitching, or thermally transferring the mark 102 onto the object 104. The mark 102 includes one or more artifacts. In some embodiments, the mark 102 also includes intentionally-produced anti-counterfeiting features, such as microscopic patterns.

A first image-capturing device 106 (e.g., a camera, machine-vision device, or scanner) captures an image of the mark 102 after the mark 102 is applied. The circumstances under which the first image-capturing device 106 captures the image of the mark 102 are controlled, such that there is reasonable assurance that the image is, in fact, that of a genuine mark 102. For example, the time interval between the mark-applying device 100 applying the mark 102 and the first image-capturing device 106 obtaining the image of the mark 102 may be small, and the first image-capturing device 106 may be physically located next to the mark-applying device 100 along a packaging line. Thus, when the term "genuine mark" is used, it refers to a mark that was applied by a mark-applying device at a legitimate source (i.e., not copied illegally or surreptitiously).

The first image-capturing device 106 transmits the captured image to a first computing device 108. Possible embodiments of the first computing device 108 include a desktop computer, a rack-mounted server, a laptop computer, a tablet computer, and a mobile communication device. In some embodiments, the first image-capturing device 106 is integrated with the first computing device 108, in which case the first image-capturing device 106 transmits the captured image to logic circuitry of the first computing device 108. The first computing device 108 or logic circuitry therein receives the captured image and transmits the captured image to a second computing device 110. Possible implementations of the second computing device 110 include all of those devices listed for the first computing device 108.

Upon receiving the captured image, the second computing device 110 generates one or more filtered profiles of one or more features of the genuine mark 102. Actions that the second computing device may perform in carrying out this task in an embodiment are those set forth in FIG. 5, which will be described in more detail below. The second computing device 110 stores the filtered profiles in the media storage device 112.

Continuing with FIG. 1, an unverified physical object 114 ("unverified object 114"), which may or may not be the legitimate physical object 104, needs to be tested to ensure that it is not counterfeit or otherwise illegitimate. Possible embodiments of the unverified object 114 are the same as those of the legitimate physical object 104. On the unverified object 114 is a candidate mark 116. Possible embodiments of the candidate mark 116 are the same as those of the genuine mark 102. A second image-capturing device 118 (e.g., a camera, machine-vision device, or scanner) captures an image of the candidate mark 116 and transmits the image to a third computing device 120. As with the first image-capturing device 106 and the first computing device 108, the second image-capturing device 118 may be part of the third computing device 120, and the transmission of the captured image of the candidate mark 116 may be internal (i.e., from the second image-capturing device 118 to logic circuitry of the third computing device 120). The third computing device 120 (or logic circuitry therein) receives the captured image and transmits the captured image to the second computing device 110.

Upon receiving the captured image, the second computing device 110 generates one or more filtered profiles of one or more features of the candidate mark 116. Actions that the second computing device may perform in carrying out this task in an embodiment are those set forth in FIG. 6, which will be described in more detail below.

Figure 2:
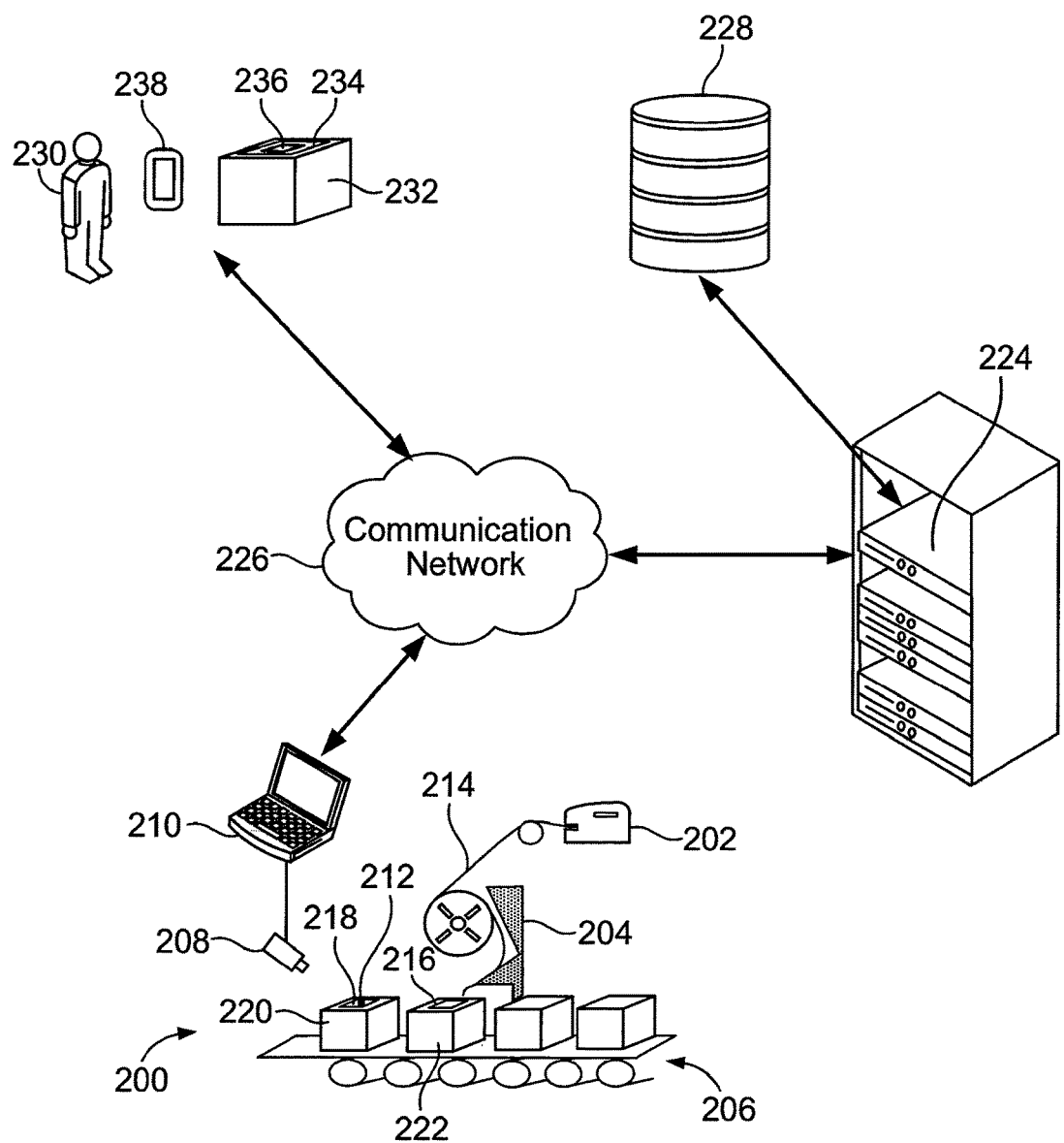
FIG. 2 is another example of a system in which various embodiments of the disclosure may be implemented.

Turning to FIG. 2, an example of a system that may be used in another embodiment is described. Located at a packaging facility 200 are a label printer 202, a label-applying device 204, a packaging line 206, an image-capturing device 208, and a first computing device 210. The label printer 202 applies genuine marks, including a genuine mark 212 ("mark 212"), to a number of labels that are carried on a label web 214. Possible embodiments of a genuine mark include a one-dimensional ("1D") barcode and a 2D barcode. The label applying device 204 applies the labels (including individually-shown labels 216 and 218 of FIG. 2) to legitimate physical objects, two of which are shown in FIG. 2 with reference numbers 220 and 222 ("first object 220" and "second object 222"). FIG. 2 shows the physical objects as being boxes (e.g., boxes containing manufactured products), but the objects do not have to be boxes or containers. Possible embodiments of the legitimate physical objects include those listed previously for the object 104 of FIG. 1.

The image-capturing device 208 captures an image of the mark 212 and transmits the captured image to a first computing device 210. The first computing device 210 receives the captured image and transmits the captured image to a second computing device 224 via a communication network 226 ("network 226"). Possible embodiments of the network 226 include a local-area network, a wide-area network, a public network, a private network, and the Internet. The network 226 may be wired, wireless, or a combination thereof.

Upon receiving the captured image, the second computing device 224 generates one or more filtered profiles of one or more features of the genuine mark 212. Actions that the second computing device 224 may perform in carrying out this task in an embodiment are those set forth in FIG. 5, which will be described in more detail below. The second computing device 224 stores the filtered profiles in the media storage device 228.

Continuing with FIG. 2, at some point in the chain of distribution from the packaging facility 200 to a point of distribution (e.g., a point of sale), a user 230 (e.g., a salesperson or law enforcement worker) handles an unverified physical object 232 ("unverified object 232") that has an unverified label 234 that carries a candidate mark 236. Indicia on the unverified object 232 or information encoded in the candidate mark 236 might suggest that the unverified object 232 originated from a legitimate source, such as the packaging facility 200 (or the company for which the packaging facility 200 is handling the original objects on the packaging line 206). In this scenario, the user 230 wishes to determine whether the unverified object 232 is counterfeit or otherwise illegitimate.

The user 230 launches an application on a third computing device 238 which, in FIG. 2, is depicted as a smartphone. The third computing device 238, under control of the application (and possibly in response to additional input from the user 230) captures an image of the candidate mark 236 (e.g., using a camera 314, depicted in FIG. 3). The third computing device 238 decodes the explicit data in the candidate mark 236 (e.g., data in a bar code, which indicates the identity of a product to which the bar code is applied), and transmits the captured image to the second computing device 224 via the network 226.

Upon receiving the captured image, the second computing device 224 generates one or more filtered profiles of one or more features of the candidate mark 236. Actions that the second computing device 224 may perform in carrying out this task in an embodiment are those set forth in FIG. 6, which will be described in more detail below.

Figure 3:
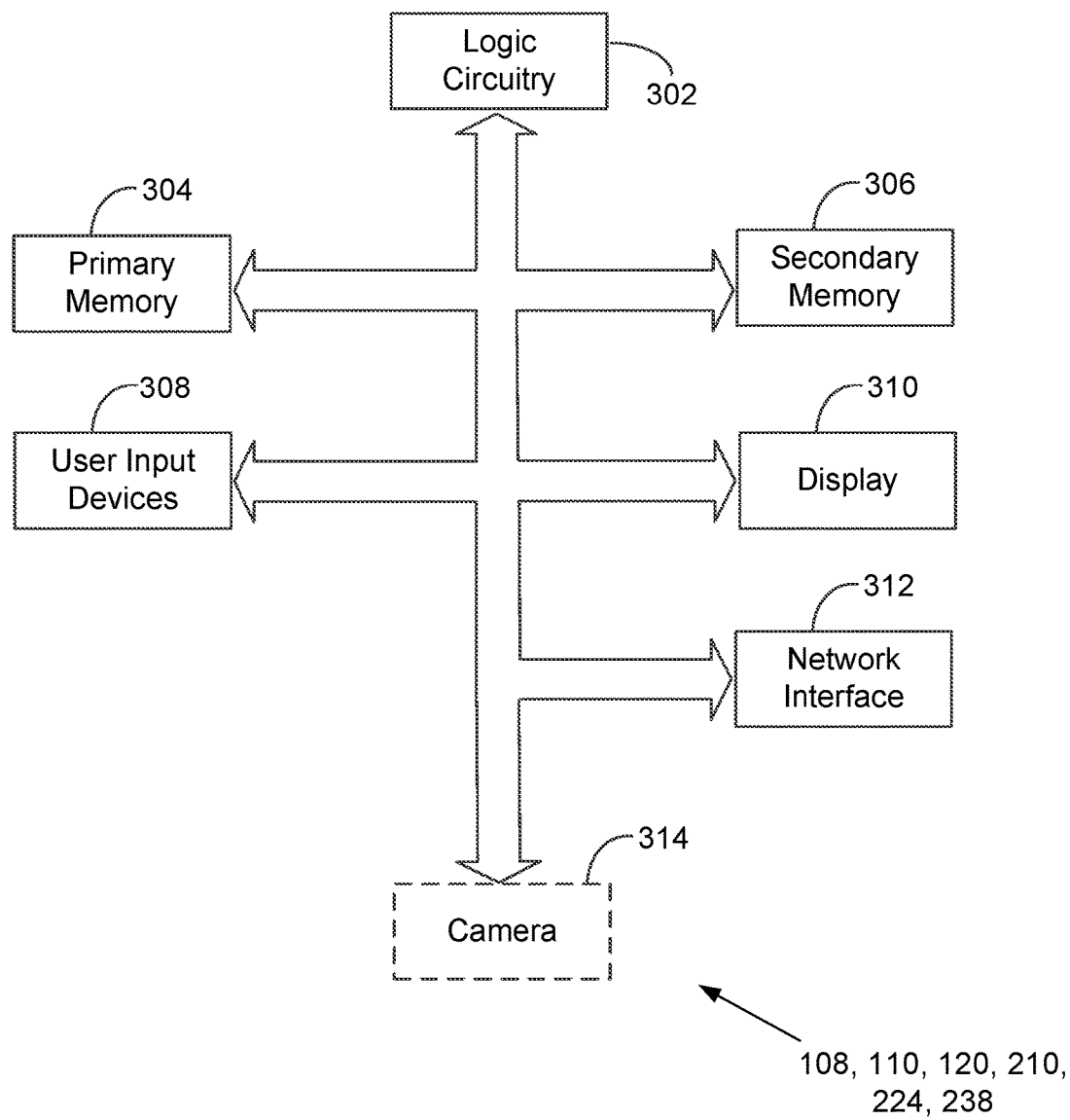
FIG. 3 shows the architecture of a computing device according to an embodiment.

In one implementation, one or more of the computing devices 108, 110, and 120 of FIG. 1 and one or more of the computing devices 210, 224, and 238 of FIG. 2 have the general architecture shown in FIG. 3. The device depicted in FIG. 3 includes logic circuitry 302, a primary memory 304 (e.g., volatile memory, random-access memory), a secondary memory 306 (e.g., non-volatile memory), user input devices 308 (e.g., a keyboard, mouse, or touchscreen), a display 310 (e.g., an organic, light-emitting diode display), and a network interface 312 (which may be wired or wireless). The memories 304 and 306 store instructions and data. Logic circuitry 302 executes the instructions and uses the data to carry out various procedures including, in some embodiments, the methods described herein (including, for example, those procedures that are said to be carried out by a computing device). Some of the computing devices may also include a camera 314 (e.g., the third computing device 238, particularly if it is implemented as a mobile communication device).

Figure 4:
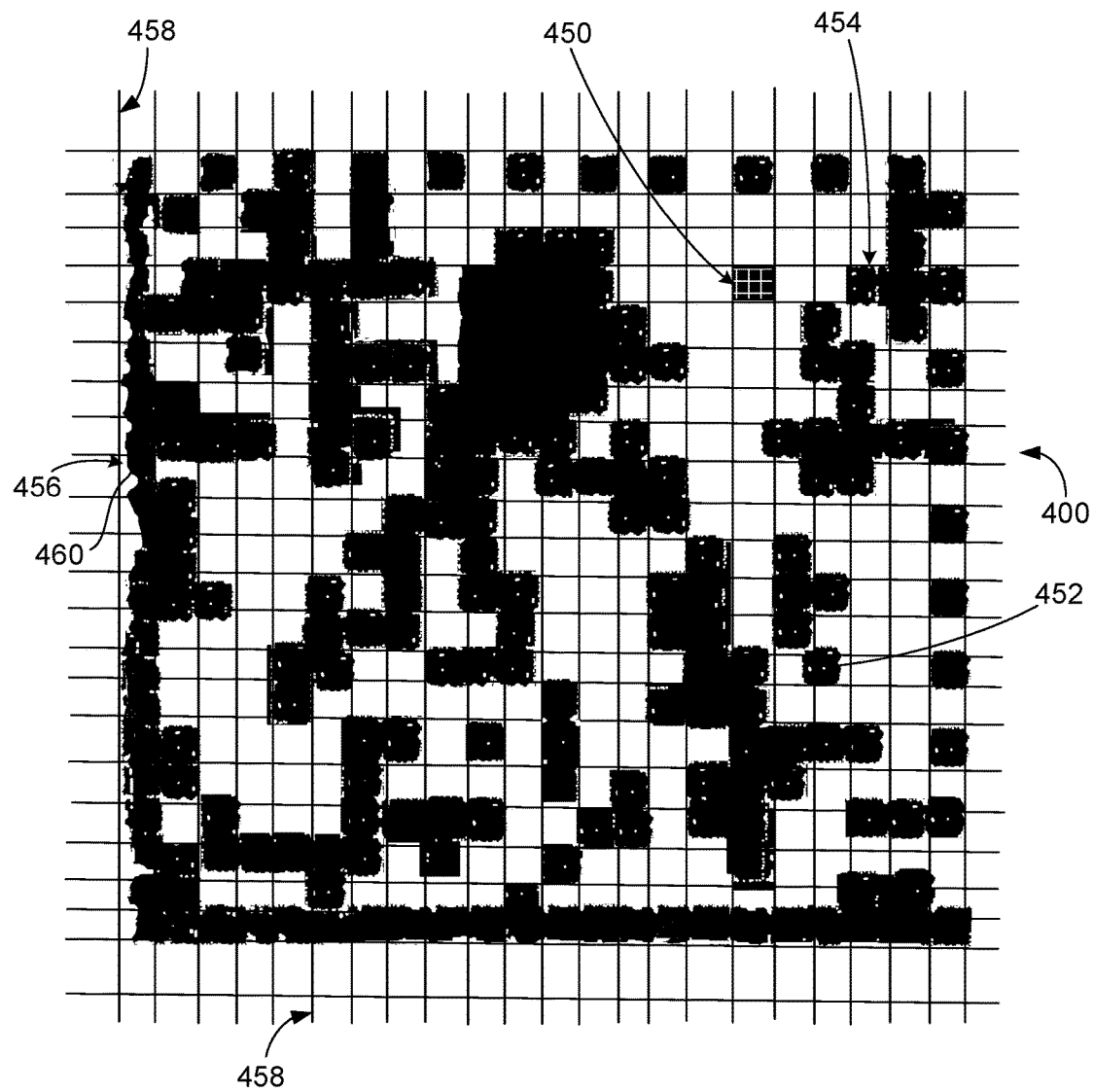
FIG. 4 shows an example of a mark according to an embodiment.

In an embodiment, a genuine mark (such as the genuine mark 212 of FIG. 2) is made up of a number of features referred to herein as "subareas." The subareas may correspond to "cells" according to ISO/IEC 15415 and may be uniformly-sized. To help illustrate some of the concepts discussed herein, attention is directed to FIG. 4, which illustrates a mark 400 having a first subarea 450, a second subarea 452, a third subarea 454, and a fourth subarea 456. A characteristic of the first subarea 450 is its average pigmentation, which a computing device may measure and determine to deviate significantly (e.g., to a degree that exceeds a predetermined threshold) from that of other subareas. A characteristic of the second subarea 452 is its offset from a best-fit grid 458. A computing device may measure this deviation and determine the amount of deviation to be significantly higher than that of other subareas. A characteristic of the third subarea 454 is the incidence of voids. A computing device may measure the incidence of voids and determine that the third subarea 454 includes significantly higher incidence of voids than other subareas. Finally, a feature that can be found in the fourth subarea 456 is an edge 460. A characteristic of the edge 460 is its linearity. A computing device may measure this linearity and determine that the linearity is significantly less than edges of other subareas.

Figure 5:
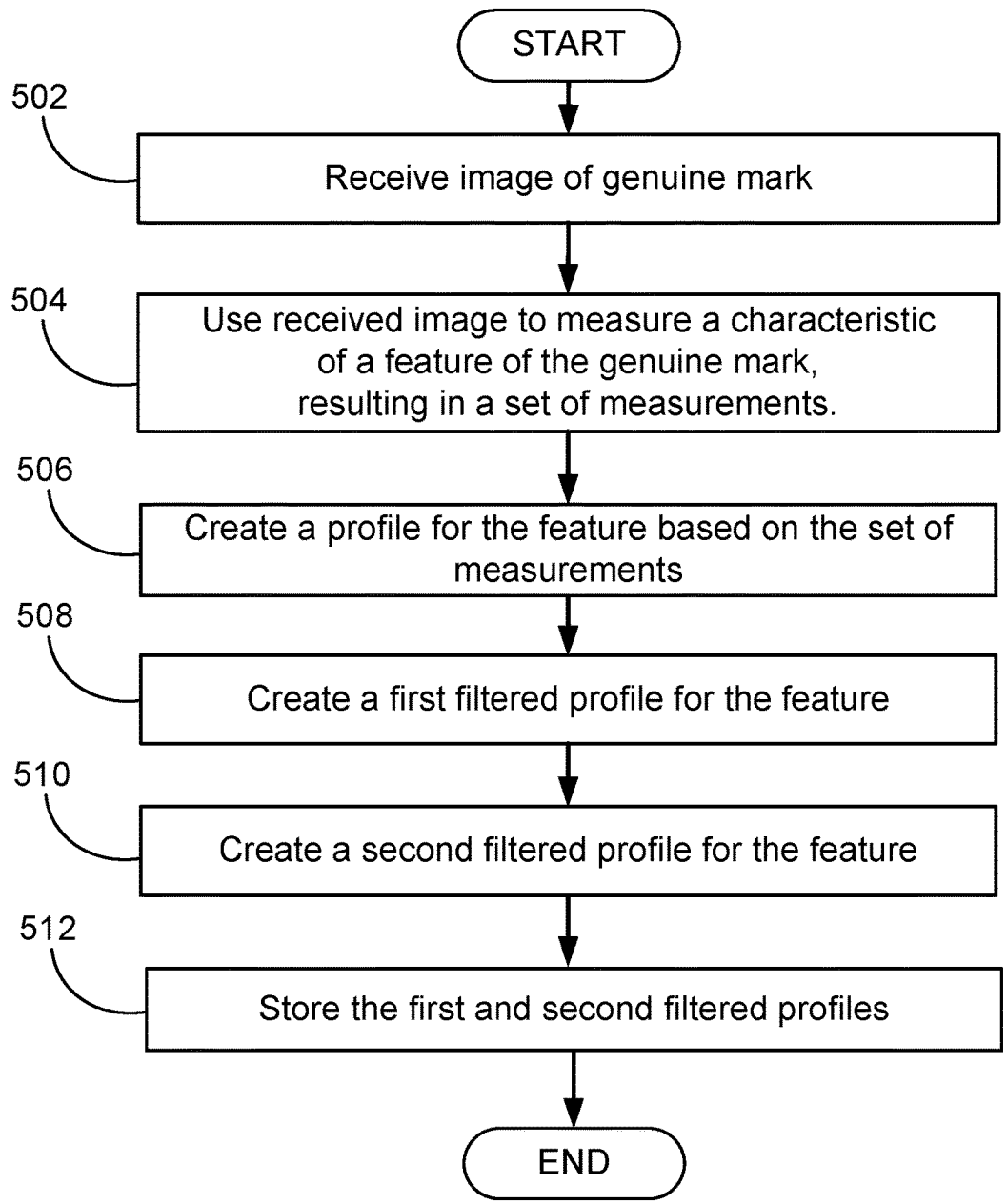
FIG. 5 is a flow chart of a process carried out by one or more computing devices according to an embodiment.

Turning to FIG. 5, an example of a procedure that the second computing device 110 or second computing device 224 carries out in an embodiment is described. At block 502, the computing device receives an image of the genuine mark. At block 504, the computing device uses the received image to make measurements of a feature of the genuine mark, resulting in a set of measurements. If a feature whose characteristics are being measured happens to be an artifact, then the set of measurements will consequently include data regarding the artifact. The set of measurements may be one of several sets of measurements that the computing device generates about the genuine mark. The computing device may carry out the measurements in different locations on the genuine mark. In doing so, the computing device can divide the mark into multiple subareas (e.g., in accordance with an industry standard). In an embodiment, if the mark is a 2D barcode, the computing device carries out measurements on all of or a subset of the total number of subareas (e.g., all of or a subset of the total number of cells) of the mark.

Examples of features of the genuine mark that the computing device may measure include: edges, bars, areas between bars, extraneous marks, regions, cells, and subareas. Examples of characteristics of features that the computing device may measure include: shape, aspect ratio, location, size, contrast, prevalence of discontinuities, color (e.g., lightness, hue, or both), pigmentation, and contrast variations. In some embodiments, the computing device takes measurements of the same characteristic on the same features from mark to mark, but on different features for different characteristics. For example, the computing device might measure the average pigmentation on a first set of subareas of a mark, and on that same first set of subareas for subsequent marks, but measure edge linearity on a second set of subareas on the mark and on subsequent marks. The two sets of subareas (for the different features) may be said to be "different" if there is at least one subarea that is not common to both sets. For example, the computing device may measure (for all or a subset of subareas of the mark): (1) the average pigmentation of some or all of the subareas of the mark (e.g., all or some of the cells), (2) any deviation in the position of the subareas from a best-fit grid, (3) the prevalence of stray marks or voids, and (4) the linearity of one or more edges of the subarea.

At block 506, the computing device creates a profile for the feature based on the measurements. At block 508, the computing device creates a first filtered profile for the feature. For example, the computing device applies a first band-pass filter to the profile. At block 510, the computing device creates a second filtered profile for the feature. For example, the computing device applies a second band-pass filter to the profile. At block 512, the computing device stores the first and second filtered profiles (e.g., in the media storage device 112 or the media storage device 228).

In an embodiment, a computing device (such as the second computing device 110 or second computing device 224) measures the pixel value (e.g., the grayscale value) of each pixel along a line starting from the interior of a portion of a mark and extending out beyond an edge of the mark and calculates an average of all of the measured pixels (referred to as the "projected average pixel value").

Figure 6:
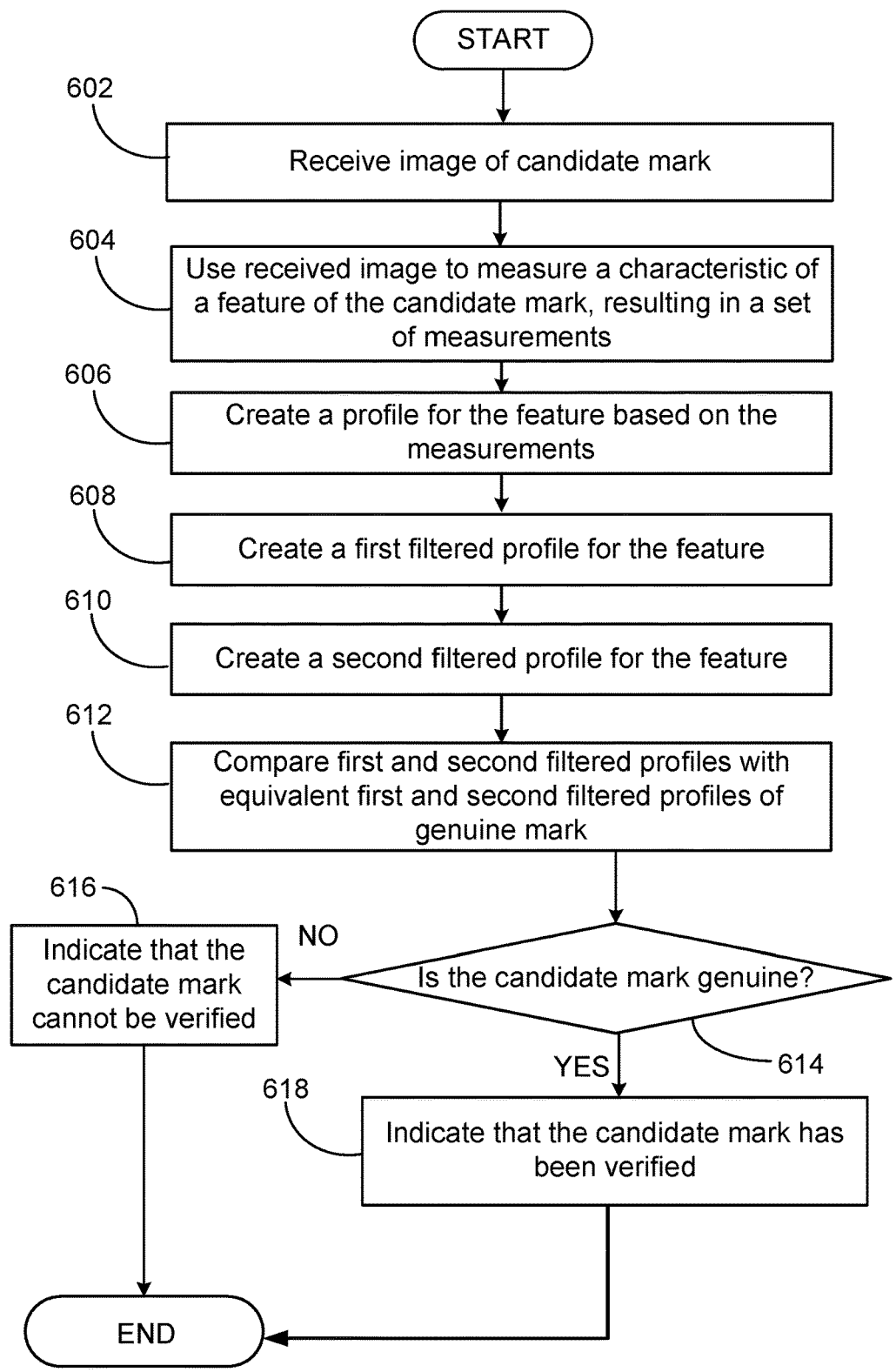
FIG. 6 is a flow chart of a process carried out by one or more computing devices according to another embodiment.

Turning to FIG. 6, an example of a procedure that the second computing device 110 or second computing device 224 carries out in an embodiment is described. At block 602, the computing device receives an image of a candidate mark. At block 604, the computing device uses the received image to make measurements of a feature of the candidate mark. At block 606, the computing device creates a profile for the feature based on the measurements. At block 608, the computing device creates a first filtered profile for the feature. At block 610, the computing device creates a second filtered profile for the feature. The computing device may carry out blocks 606, 608, and 610 using the image of the candidate mark in the same way described above (e.g., blocks 506, 508, and 510) for the genuine mark. At block 612, the computing device compares the first and second filtered profiles with equivalent first and second profiles of the genuine mark (e.g., retrieving the first and second profiles of the genuine mark from the media storage device). Based on the comparison, the computing device determines, at block 614, whether the candidate mark is genuine. If the computing device determines that the candidate mark is not genuine then (at block 616) the computing device indicates that candidate mark cannot be verified (e.g., by transmitting a message to the third computing device 110, which the third computing device 110 displays to the user). If the computing device determines that the candidate mark is genuine then (at block 618) the computing device indicates that candidate mark has been verified (e.g., by transmitting a message to the third computing device 110, which the third computing device 110 displays to the user).

Figure 7A:
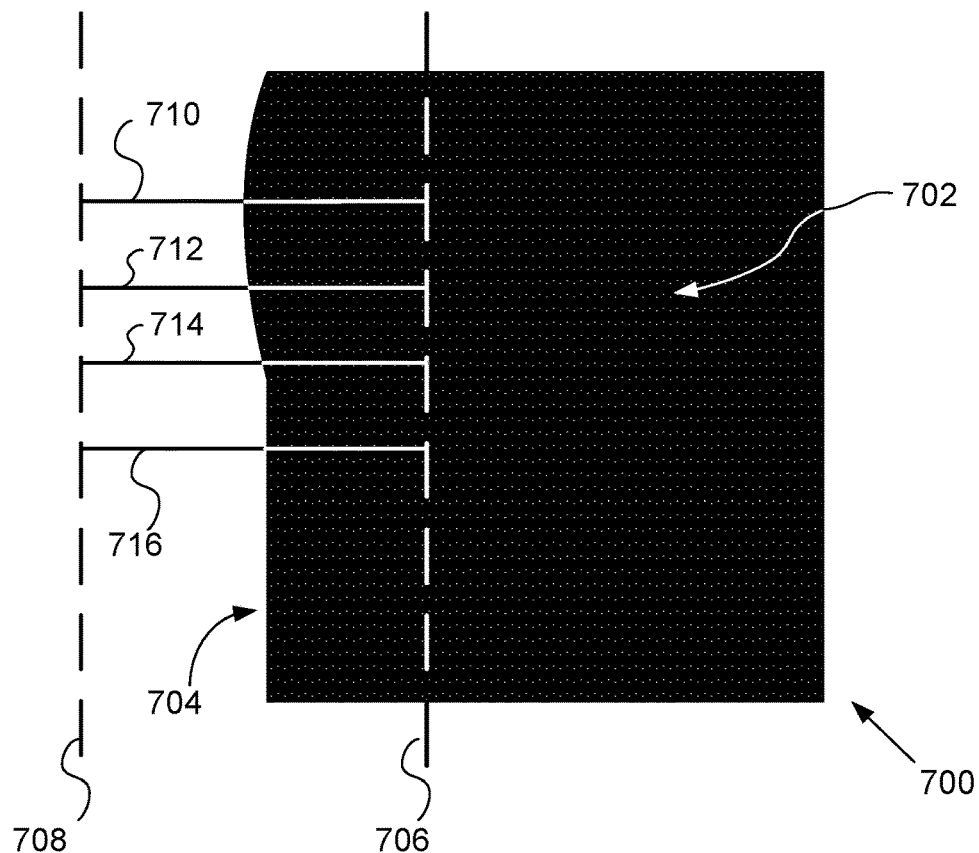
FIG. 7A and FIG. 7B show an example of how a computing device calculates projected average pixel values according to an embodiment.

As noted above, one possible feature for which a computing device (in an embodiment) can take measurements of a characteristic (e.g., block 504 or block 604) is an edge. Turning to FIG. 7A, for example, a portion 700 of a barcode has an interior area 702 (typically printed in black) and an edge 704. FIG. 7A also depicts a first reference axis 706 and extending out beyond the edge 704 to a second reference axis 708. There are many possible values for the distance between the first reference axis 706 and the second reference axis 708. For example, the distance may be the distance to the next printed area (the white space gap) or one-half the width of the printed area in which the computing device is taking measurements currently operating (the interior area 702). The distance may a larger or smaller fraction of the width of the interior area 702. In other embodiments, both the first reference axis 706 and the second reference axis 708 are within the interior area 702. In other embodiments, both axes are outside of the interior area 702 (e.g., only in the white space). The computing device in this embodiment measures the grayscale value (e.g., on a scale from 0 to 255) of each of the pixels along a first line 710, along a second line 712, along a third line 714, and along a fourth line 716. Each of the first line 710, second line 712, third line 714, and fourth line 716 starts at the first axis 706, extends out towards and beyond the edge 704, and terminates at the second axis 708.

In FIG. 7A, the lines 710, 712, 714, and 716 are depicted in FIG. 7A as being perpendicular to the first reference axis 706 and second reference axis 708, but need not be. Although depicted in FIG. 7A has being spaced apart from one another, the lines 710, 712, 714, and 716 may have no space in between one another. Furthermore, although four lines are depicted, there may be fewer (even as few as one) or more. Additionally, the lines 710, 712, 714, and 716 may be straight, but need not be. For example, if the barcode (of which the portion 700 is part) is on a curved surface, then the lines 710, 712, 714, and 716 might be straight in the x-y plane, but be curved with respect to the z-axis (e.g., bulging outwardly from the page).

Although the edge 704 is depicted as generally linear with regard to the y direction, it need not be. For example, the edge could be an offset curve (e.g., resemble a wavy line). Furthermore, while the first reference axis 706 and second reference axis 708 are depicted as being generally parallel to the edge 706, they need not be.

Figure 8:
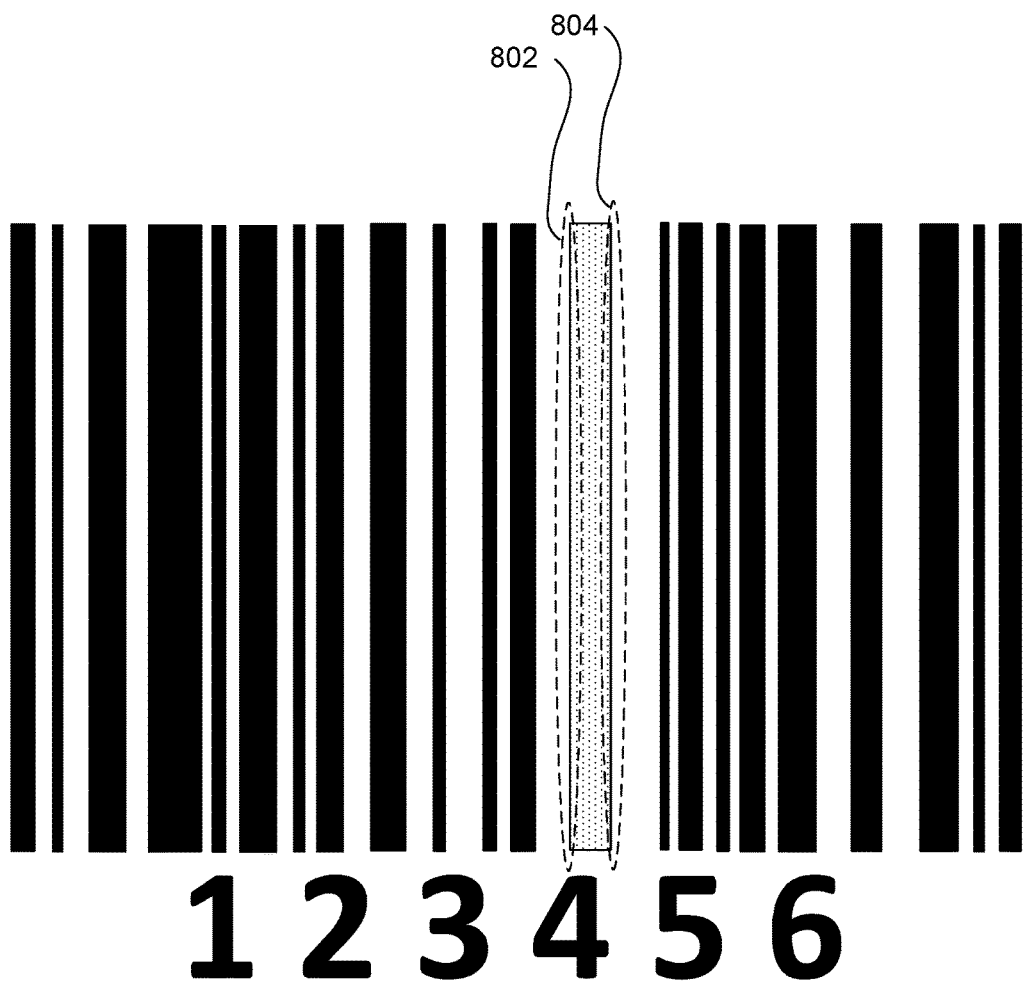
FIG. 8 shows an example of a mark according to another embodiment.

In an embodiment, if the feature is an edge, for a given edge of a mark, the computing device develops profile for the edge (blocks 506 and 606). The edge profile, in an embodiment, includes a data series of the projected average pixel values calculated for a portion of the mark that includes the edge. The computing device calculates a projected average pixel value of the pixels along each of the first line 710, second line 712, third line 714, and fourth line 716. The computing device may carry out this projected average pixel value operation on multiple edges of the mark, and do so on the entire length of an edge or less than the entire length of an edge. For example, on a 2D barcode, such as that shown in FIG. 4, the computing device may carry out the operation on any combination of: top edges of one or more cells, bottom edges of one or more cells, left edges of one or more cells, and right edges of one or more cells. In another example, on a 1D barcode, such as that shown in FIG. 8, the computing device may carry out the projected average pixel value operation on each of the bars of the portions of the bars of the barcode. For example, the computing device could carry out the operation on the portion 802 of the thirteenth bar (shaded for clarity) of the barcode of FIG. 8, which includes the leading edge of that bar, and carry out the operation on the portion 804, which includes the trailing edge. The computing device may carry out this operation on the leading and trailing edges of each of the bars.

Figure 7B:
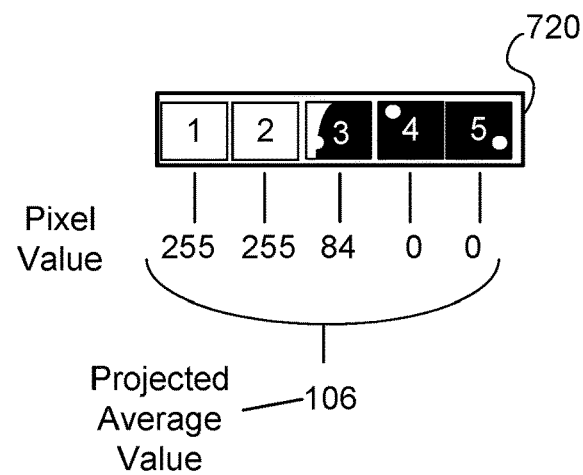

Turning to FIG. 7B, the pixels of the first line 710 are represented by four individual pixels. Naturally, there may be many more pixels, but only four are shown for ease of description. Pixels 1 and 2 each have a value of 255, Pixel 3 has a value of 84, and Pixels 4 and 5 each have a value of 0. The average of those values (the projected average pixel value) is 106.

Figure 9A:
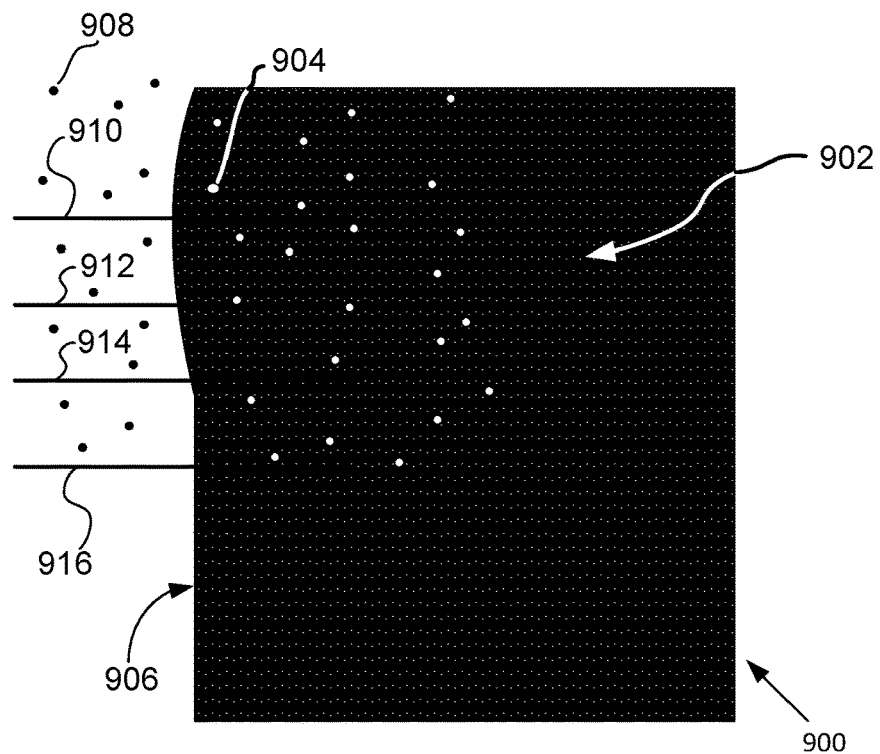
FIG. 9A and FIG. 9B show another example of how a computing device calculates projected average pixel values according to an embodiment.
Figure 9B:
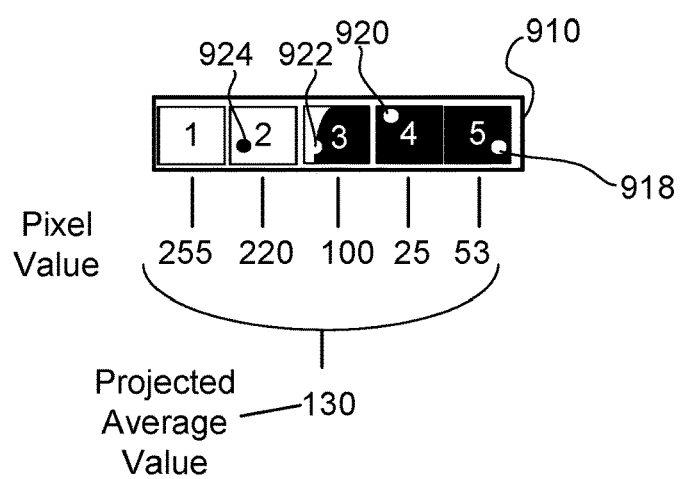

Taking an average along the projection lines allows the computing device to account for artifacts that are within the interior area 702 of the barcode portion 700 in addition to the artifacts along the edge 704. For example, FIG. 9A shows a portion 900 of a barcode having an interior area 902 in which there are extraneous voids 904, and an edge 906, beyond which are extraneous marks 908. The computing device in this embodiment measures the grayscale value each of the pixels along a first line 910, along a second line 912, along a third line 914, and along a fourth line 916. FIG. 9B illustrates that the projected average pixel value (130) along the first line 910 is partly a result of extraneous voids 918, 920, and 922, as well as extraneous mark 924. These extraneous marks and voids affect the individual values of pixels, so that Pixel 2 has a value of 220, Pixel 3 has a value of 100, Pixels 4 has a value of 25, and Pixel 5 has a value of 53.

Figure 10:
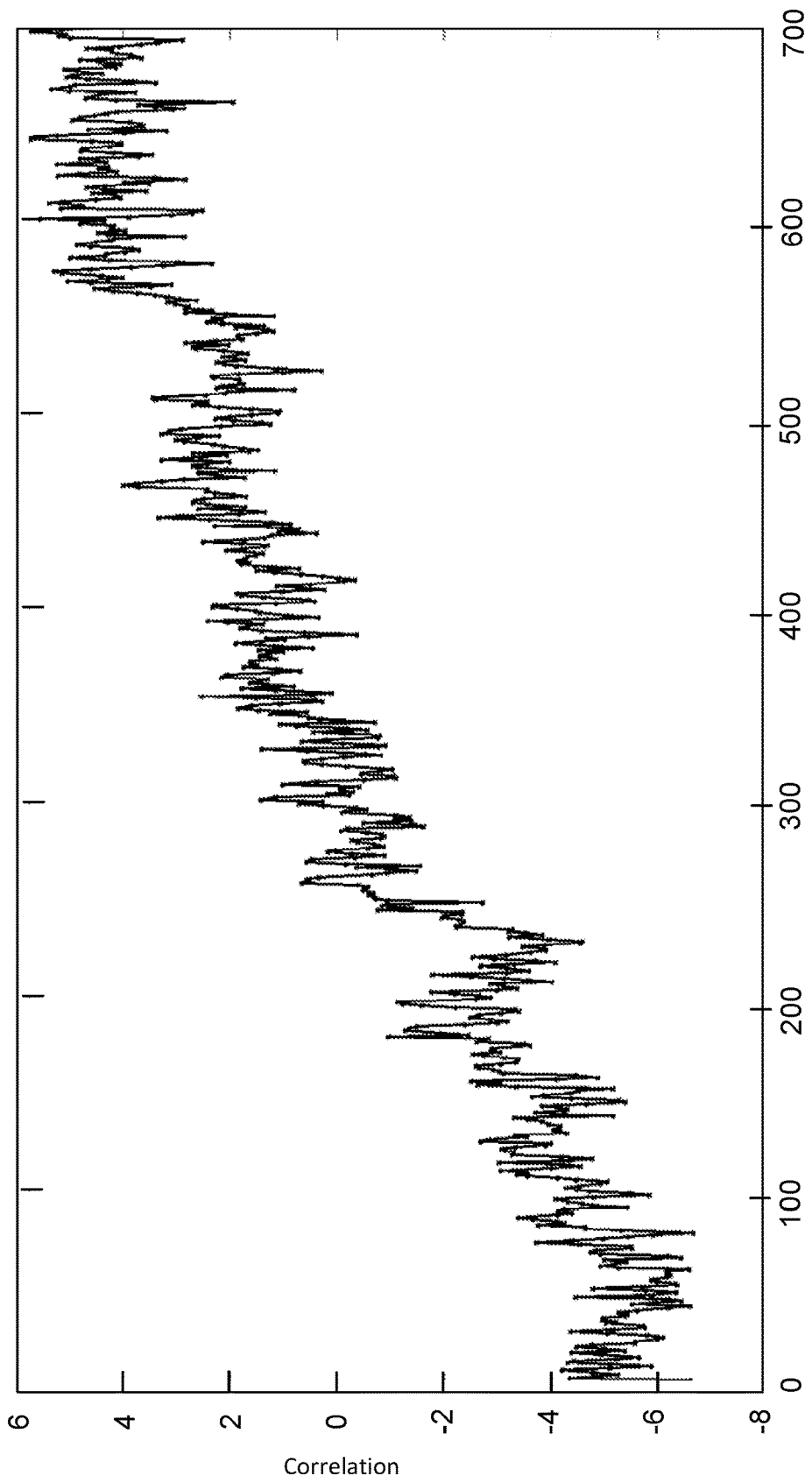
FIG. 10 shows an example of a plot of a profile of an edge according to an embodiment.

FIG. 10 depicts a plot of an example of an edge profile. The vertical axis represents the projected average pixel value (e.g., gray value) taken along a line (e.g., as described in conjunction with FIG. 7A and FIG. 9A) in the region of an edge of a mark. The horizontal axis represents the position along the first reference axis 706 (e.g., in units of pixel index values, or the order of a pixel in a continuous line of pixels along the reference axis).

Figure 11:
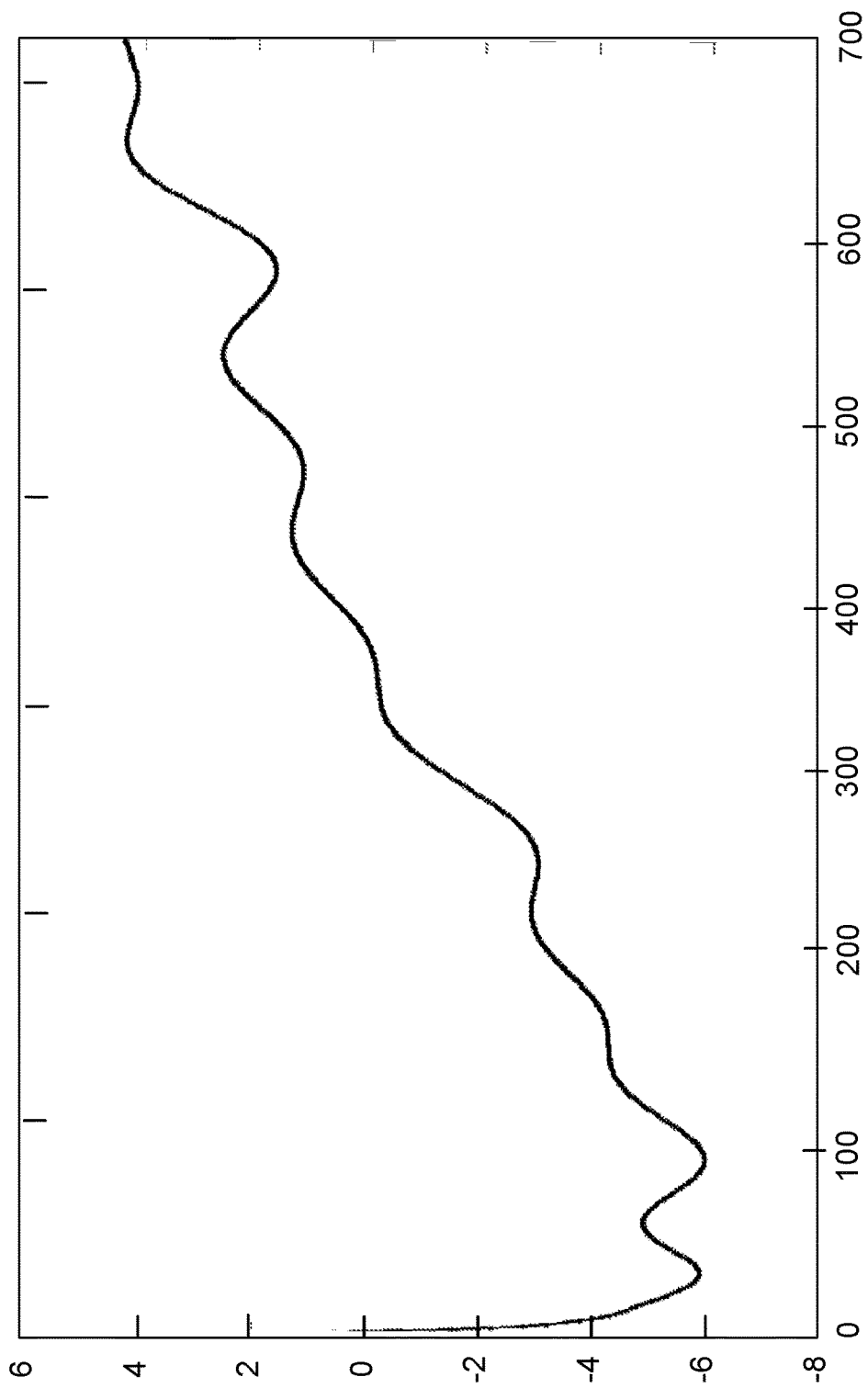
FIG. 11 shows an example of the edge profile of FIG. 10 after the computing device has applied a band-pass filter according an embodiment.

According to an embodiment, to carry out blocks 508, 510, 608, and 610, the computing device applies a series of band-pass filters, one at a time, to the profile of an edge of the mark, and may do so for multiple edge profiles (e.g., for each edge for which the computing device has developed an average value profile). The band-pass filter eliminates all spatial frequency components except for those frequency components that fall within the range of the band-pass filter. FIG. 10 shows an example of an edge profile before the computing device has applied a band-pass filter. FIG. 11 shows a plot representing the edge projection of FIG. 10 after the computing device applies a band-pass filter.

There are many possible types of filters and filtering techniques that may be used in various embodiments. In an embodiment, the computing device uses a band-pass filter that can resolve printed features in the size range between 0.3 to 3 mm. In this embodiment, the upper and lower limits for the band-pass filter are $\sigma_1=20$ and $\sigma_2=2$. The size of the smallest feature for each limit is (with length=$3\sigma$ (in pixels)). L1=60 pixels and L2=6 pixels. The upper and lower limit in cycles/profile [800 pixels per profile, f=800/(2L)]. f1=800/(60+60)=6.6 cycles/profile, f2=800/(12)=66 cycles/profile. The size of the smallest feature for each limit in mm (with 800 pixels per 4 cm, 0.05 mm/pixel, L1=3 mm, L2=0.3 mm. Accordingly, the band-pass filter resolves printed features in the size range between 0.3 to 3 mm.

In another embodiment, the band-pass filter resolves printed features in the size range between 1.5-4.5 mm: $\sigma_1=30$ and $\sigma_2=10$. L1=90 pixels or 4.5 mm, f1=4.4 cycles/profile.

In an embodiment, the computing device creates multiple filtered profiles for a genuine mark over multiple spatial frequency bands and stores those filtered profiles in a media storage device. Subsequently, when the computing device receives an image of a candidate mark that is to be tested for genuineness, the computing device (a) creates filtered profiles for the candidate mark (e.g., blocks 508, 510, 608, and 610), (b) compares the filtered profile for the candidate mark in a particular spatial frequency band with the filtered profile of the genuine mark in the same spatial frequency band (e.g., by running a statistical correlation function on the data series of the filtered profile of the genuine mark and the filtered profile of the candidate mark) (e.g., block 612), (c) assigns a correlation score based on the statistical correlation, (d) repeats (b) and (c) for multiple frequency bands, and (e) creates a spatial frequency spectrum correlation profile based on the collection of correlation scores. For example, the correlation score may be the numerical series correlation for the genuine and candidate metrics data band-filtered at a particular frequency band.

In an embodiment, the spatial frequency spectrum correlation profile is made up of a data series that includes the correlation scores ordered in a predetermined manner. FIG.

12 shows an example of a spatial frequency spectrum correlation profile, depicted as a plot. The horizontal axis is made up of numerical values assigned to each of the band-pass filters. For example, band-pass filter #1 might admit spectral components from wavelengths of 3 millimeters to 6 millimeters, band-pass filter #2 might admit spectral components from wavelengths of 6 millimeters to 12 millimeters, etc. The vertical axis is made up of the correlation scores of the correlation operation carried out by the computing device on the respective filtered profiles of the candidate mark and the genuine mark.

Figure 12:
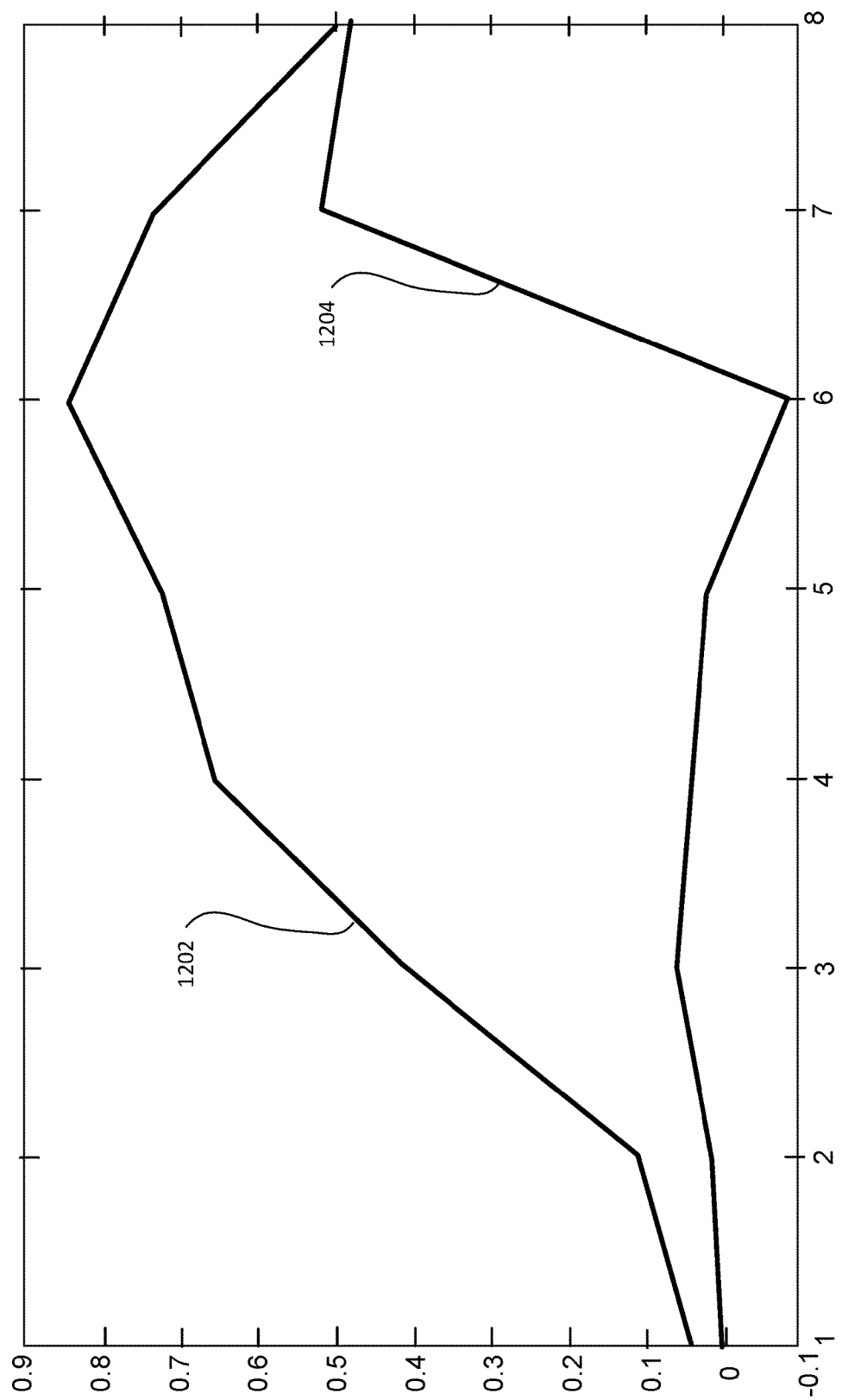
FIG. 12 and FIG. 13 show examples of spatial frequency spectrum correlation profiles according to various embodiments.
Figure 13:
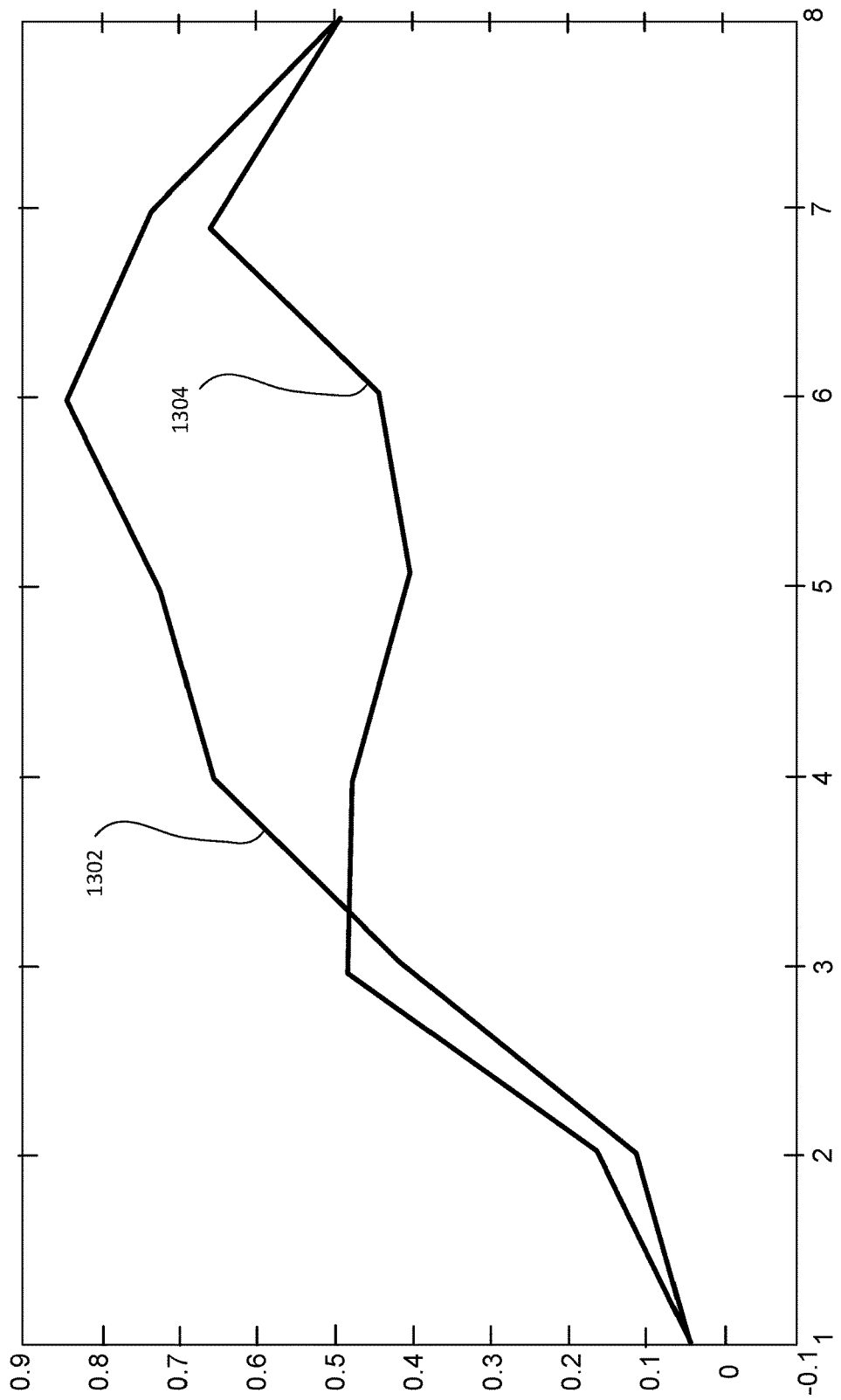

In an embodiment, the computing device compares the spatial frequency spectrum correlation profile of a candidate mark and that of a genuine mark and determines, based on the comparison, whether the candidate mark is the genuine mark. Additionally or alternatively, the computing device determines whether the candidate mark was printed using the same printing plate as the genuine mark (e.g., after making a determination that the candidate mark is not genuine). The shape of the spatial frequency spectrum correlation profile indicates the result and the computing device may interpret this shape as part of carrying out block 614. For example, FIG. 12 shows the typical 'hump' shape of a genuine mark (line 1202) and the low, flat line of a counterfeit mark (line 1204). FIG. 13 shows a genuine (line 1302) vs. a photocopy of the same genuine mark (line 1304).

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the flow charts of FIG. 5 and FIG. 6 can be reordered in ways that will be apparent to those of skill in the art. Furthermore, the steps of these flowcharts as well as the methods described herein may all be carried out on a single computing device.

What is claimed is:

1. A method, on a computing device, for determining whether a mark is genuine, the method comprising:
receiving an image of a candidate mark;
using the received image, measuring a characteristic of a feature of the candidate mark, resulting in a set of measurements;
creating a profile for the feature based on the set of measurements;
creating a first filtered profile for the feature by filtering, from the profile of the feature, all spatial frequency components except for those in a first spatial frequency band;
creating a second filtered profile for the feature by filtering, from the profile of the feature, all spatial frequency components except for those in a second spatial frequency band;
comparing the first filtered profile of the feature with an equivalent first filtered profile of a feature of a genuine mark;
comparing the second filtered profile of the feature with an equivalent second filtered profile of a feature of the genuine mark;
determining whether the candidate mark is genuine based on the first filtered profile comparison and the second filtered profile comparison; and
indicating a result of the determination to a user,
wherein the first spatial frequency band contains a first range of spatial frequencies and the second spatial frequency band contains a second range of spatial frequencies, and
wherein the second range is different from the first range.

2. The method of claim 1, further comprising:
receiving an image of the genuine mark;
using the received image of the genuine mark, measuring a characteristic of a feature of the genuine mark, resulting in a set of measurements;
creating a profile for the feature of the genuine mark based on the set of measurements of the feature of the genuine mark;
creating the equivalent first filtered profile of the genuine mark by filtering, from the profile of the feature of the genuine mark, all spatial frequency components except for those in the first spatial frequency band; and
creating the equivalent second filtered profile of the genuine mark by filtering, from the profile of the feature of the genuine mark, all spatial frequency components except for those in the second spatial frequency band.

3. The method of claim 1, wherein
the feature is an edge of the mark,
measuring the characteristic of the feature of the candidate mark comprises calculating a plurality of projected average pixel values in a portion of the mark that includes the edge, and
creating the profile for the feature comprises creating a profile of the edge based the calculated plurality of projected average pixel values calculated in a portion of the candidate mark that includes the edge.

4. The method of claim 3, wherein calculating the plurality of projected average pixel values comprises calculating at least one projected pixel value along a line that runs from a first reference axis that extends in a direction generally parallel to the edge to a second reference axis that extends in a direction generally parallel to the edge.

5. The method of claim 4, wherein the mark is a barcode, the first reference axis is within a bar of the barcode, and the second reference axis is between bars of the barcode.

6. The method of claim 4, wherein the mark is a barcode, the first reference axis is within a bar of the barcode, and the second reference axis is within the bar.

7. The method of claim 4, wherein the mark is a barcode, the first reference axis is between bars of the barcode, and the second reference axis is between bars of the barcode.

8. The method of claim 1, further comprising:
creating further filtered profiles for the feature for further spatial frequency bands; and
comparing each of the further filtered profiles with equivalent filtered profiles of the feature on the genuine mark,
wherein determining whether the candidate mark is genuine is further based on the further filtered profiles.

9. The method of claim 1, further comprising:
assigning a first correlation score to the first spatial frequency band based on the comparison of the first filtered profile of the feature with the equivalent first filtered profile of the feature of the genuine mark;
assigning a second correlation score to the second spatial frequency band based on the comparison of the second filtered profile of the feature with the equivalent second filtered profile of the feature of the genuine mark; and
creating a spatial frequency spectrum correlation profile using the first correlation score and the second correlation score, wherein determining whether the candidate mark is genuine comprises determining whether the candidate mark is genuine based on at least one of the first and second correlation scores.

10. The method of 9, wherein
creating the spatial frequency spectrum correlation profile comprises:
   mapping the first correlation score to a first band-pass filter of the first spatial frequency band; and
   mapping the second correlation score to a second band-pass filter of the second spatial frequency band, and
determining whether the candidate mark is genuine comprises analyzing the mapped correlation scores and spatial frequency bands.

11. The method of claim 1, wherein
creating the first filtered profile comprises applying a first band-pass filter to the feature profile;
creating the second filtered profile comprises a second band-pass filter to the feature profile separately from the application of the first band-pass filter.

12. The method of claim 1, wherein the feature is an artifact.

13. The method of claim 1, wherein the feature is a subarea of the candidate mark, and the measurement is a measurement of the average pigmentation of the subarea.

14. The method of claim 1, wherein the feature is a subarea of the candidate mark, and the measurement is a measurement of deviation in the position of the subarea from a best-fit grid.

15. The method of claim 1, wherein the feature is a subarea of the candidate mark, and the measurement is a measurement of stray marks or voids in the subarea.

16. The method of claim 1, wherein receiving the image of the candidate mark comprises receive the image from a camera built into the computing device.

17. The method of claim 1, wherein receiving the image of the candidate mark comprises receive via a network.

18. The method of claim 1, wherein the mark is selected from a group consisting of a barcode, a logo, and a decoration.

19. A computing device comprising a hardware processor that carries out actions comprising:
   receiving an image of a candidate mark;
   using the received image, making a plurality of measurements of a feature of the candidate mark;
   creating a profile for the feature based on the plurality of measurements;
   creating a first filtered profile for the feature by filtering, from the profile of the feature, all spatial frequency components except for those in a first spatial frequency band;
   creating a second filtered profile for the feature by filtering, from the profile of the feature, all spatial frequency components except for those in a second spatial frequency band;
   comparing the first filtered profile of the feature with an equivalent first filtered profile of a feature of a genuine mark;
   comparing the second filtered profile of the edge with an equivalent second filtered profile of a feature of the genuine mark;
   determining whether the candidate mark is genuine based on the first filtered profile comparison and the second filtered profile comparison; and
   indicating a result of the determination to a user,
   wherein the first spatial frequency band contains a first range of spatial frequencies and the second spatial frequency band contains a second range of spatial frequencies, and
   wherein the second range is different from the first range.

20. A non-transitory computer-readable medium having stored thereon computer-executable instructions for carrying out actions comprising:
   receiving an image of a candidate mark;
   using the received image, making a plurality of measurements of a feature of the candidate mark;
   creating a profile for the feature based on the plurality of measurements;
   creating a first filtered profile for the feature by filtering, from the profile of the feature, all spatial frequency components except for those in a first spatial frequency band;
   creating a second filtered profile for the feature by filtering, from the profile of the feature, all spatial frequency components except for those in a second spatial frequency band;
   comparing the first filtered profile of the feature with an equivalent first filtered profile of a feature of a genuine mark;
   comparing the second filtered profile of the edge with an equivalent second filtered profile of a feature of the genuine mark;
   determining whether the candidate mark is genuine based on the first filtered profile comparison and the second filtered profile comparison; and
   indicating a result of the determination to a user,
   wherein the first spatial frequency band contains a first range of spatial frequencies and the second spatial frequency band contains a second range of spatial frequencies, and
   wherein the second range is different from the first range.

* * * * *